United States Patent [19]

Inoue et al.

[11] 4,365,663
[45] Dec. 28, 1982

[54] METHOD AND SYSTEM FOR CONTROLLING A VEHICLE-MOUNTED AIR CONDITIONER

[75] Inventors: Yozo Inoue, Chiryu; Kiyoshi Hara; Yoji Ito, both of Kariya, all of Japan

[73] Assignees: Nippondenso Co., Ltd., Kariya; Toyota Jidosha Kogyo Kabushiki Kaisha, Toyota, both of Japan

[21] Appl. No.: 223,083

[22] Filed: Jan. 7, 1981

[30] Foreign Application Priority Data

Jan. 16, 1980 [JP] Japan .................................. 55-3813

[51] Int. Cl.³ .......................... F25B 29/00; B60H 3/00
[52] U.S. Cl. ......................................... 165/12; 165/30; 165/43; 62/180
[58] Field of Search ....................... 165/12, 16, 26, 27, 165/30, 41, 42, 43; 62/157, 158, 180, 244, 323.4; 236/46 R

[56] References Cited

U.S. PATENT DOCUMENTS 4,328,855 5/1982 Iwata et al. ........................... 165/30
4,340,113 7/1982 Iwata et al. ........................... 165/30

FOREIGN PATENT DOCUMENTS 54-12692 5/1979 Japan .

*Primary Examiner*—William E. Wayner
*Assistant Examiner*—Harry Tanner
*Attorney, Agent, or Firm*—Cushman, Darby & Cushman

[57] ABSTRACT

A vehicle-mounted air conditioner includes a compressor which, when powered by the vehicle engine, supplies pressurized refrigerant to an evaporator to increase its cooling capacity, a heating unit located downstream of the evaporator and partially occupying the passage of air cooled and directed toward vehicle interior by the evaporator, and a mixing damper pivoted at a point upstream of the heating unit to adjust the amount of cool air presented thereto in relation to the air directed toward the vehicle interior. The compressor is coupled to the engine when the temperature in the vehicle interior indicates a demand for a temperature decrement, or decoupled from the engine when the interior temperature indicates a demand for a temperature increment. A control system detects when the compressor is switched from a first operating state to a second state and initiates a timing action to measure the elapse of time from the time of detection of the occurrence of the transient condition. A time-varying signal is generated when the measured amount of time reaches a predetermined value for controlling the mixing damper to gradually vary the amount of air presented to the heating unit in relation to the air directed to the vehicle interior.

6 Claims, 6 Drawing Figures

METHOD AND SYSTEM FOR CONTROLLING A VEHICLE-MOUNTED AIR CONDITIONER

BACKGROUND OF THE INVENTION

The present invention relates to air conditioners, and in particular to a method for operating a vehicle-mounted air conditioner by conserving the energy of a compressor that supplies pressurized refrigerant to the evaporator. The invention also relates to a vehicle-mounted air conditioner having a power saving compressor control circuit.

Conventionally, vehicle-mounted air conditioners comprise a compressor which, when powered by the vehicle engine, supplies pressurized refrigerant to an evaporator, a heating unit supplied with heated water from the engine cooling system for heating air cooled by the evaporator, and a mixing damper pivotally mounted upstream of the heating unit to adjust the amount of cooled air presented to the heating unit in relation to the amount of cooled air directed toward the interior of the vehicle. The compressor is controllably coupled to the engine output shaft when the vehicle interior temperature demands an increase in cooling capacity, or decoupled from the engine when the interior temperature indicates that the cooling capacity be decreased. Although this compressor control strategy is advantageous in saving energy, there is an undesirable sharp variation in the interior temperature at the instant the compressor operating state is changed.

To overcome this problem Japanese Pat. No. 54-12692 discloses a control system which involves the use of a temperature sensor located downstream of the evaporator for sensing the temperature of cooled air. The resistance of this temperature sensor increases when the compressor is shut off and this increase in resistance is detected by a comparator which in turn operates the mixing damper in a direction that reduces the amount of cool air presented to the heating unit in relation to the amount of cool air directed to the vehicle interior.

SUMMARY OF THE INVENTION

An object of the present invention is to provide a method for controlling a vehicle-mounted air conditioner which eliminates the need for a temperature sensor which detects the temperature of cool air immediately downstream of the evaporator.

According to the invention, the control system for the vehicle-mounted air conditioner initiates a timing action in response to a detected transitory state of the compressor as it switches from a first operating state to a second state. This timing action is to introduce a delay which corresponds to the time required for the compressor to attain the second operating state. A reference signal is generated when a predetermined amount of time has elapsed from the time the transitory state is detected. This reference signal varies in magnitude as a function of time until it reaches a preselected voltage level and is used to control the opening angle of the mixing damper so that the amount of cool air presented to the heating unit is gradually adjusted in relation to the amount of cool air directed to the vehicle interior to thereby compensate for rapid variation of the vehicle interior temperature.

BRIEF DESCRIPTION OF THE DRAWINGS

The invention will be further described by way of example with reference to the accompanying drawings, in which.

DETAILED DESCRIPTION

Figure 1:
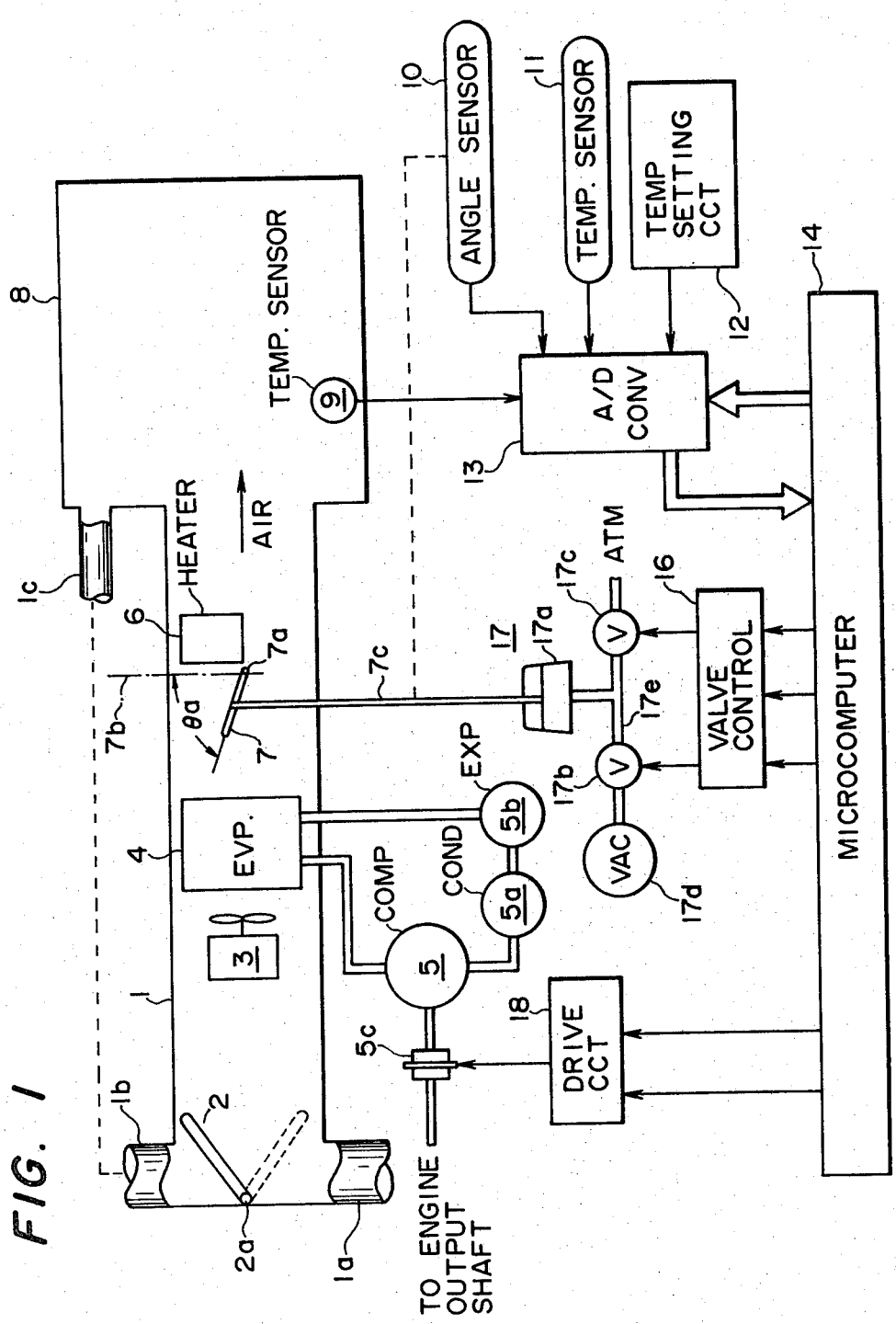
FIG. 1 is an illustration of a block diagram of an embodiment according to the present invention.
Figure 2:
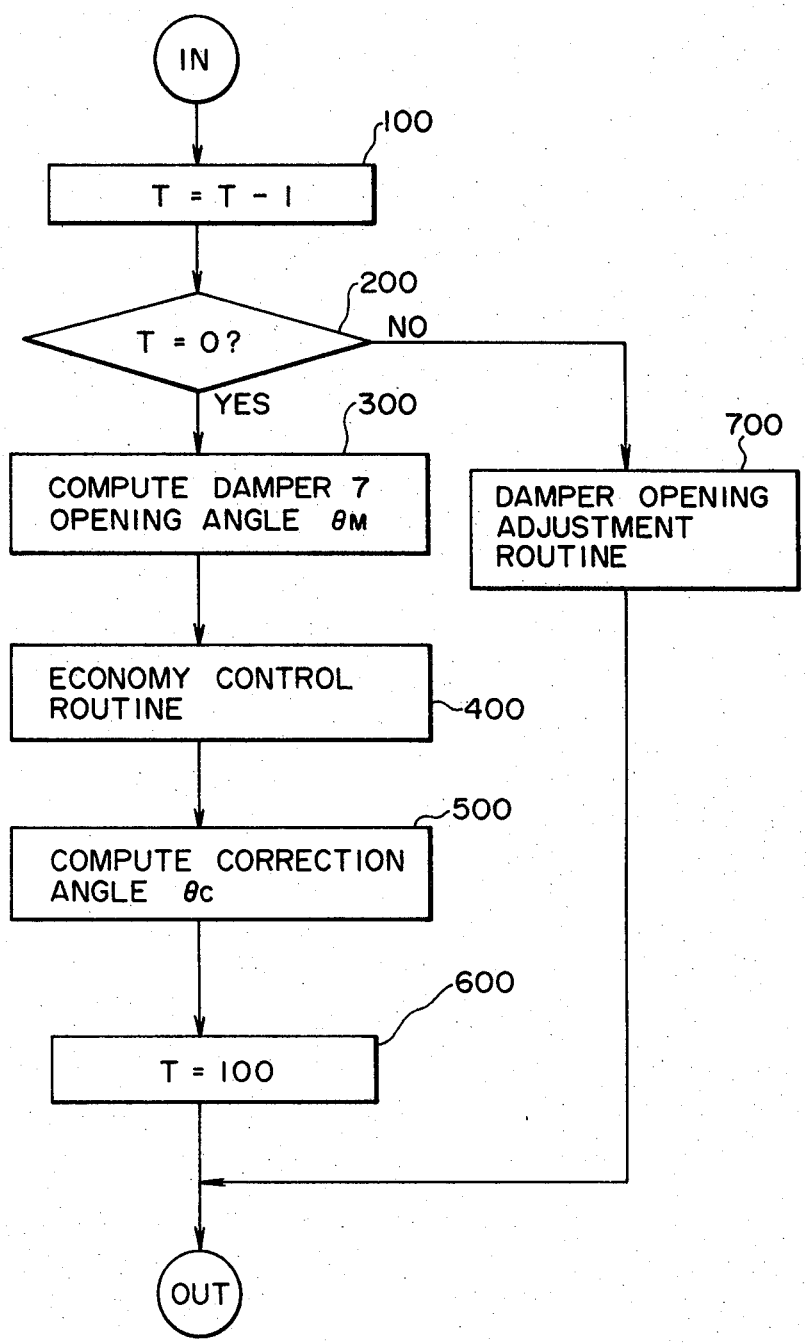
FIG. 2 is a schematic illustration of a flowchart which describes the general routines of the microcomputer of FIG. 1.

In FIG. 1, a vehicle air conditioner and its related control circuitry are illustrated schematically as comprising an air duct 1 in which an air blower 3, an evaporator 4 and a heater 6 are mounted in the order named from the upstream side to the downstream side of the duct 1. The duct 1 is provided with an air inlet opening 1a through which outside air is introduced and a second air inlet opening 1b which is connected to the vehicle interior 8 by way of a recirculating duct 1c. The downstream side of the duct 1 is open to the vehicle interior 8 to supply it with conditioned air. At the upstream side of the duct 1 is provided a switching damper 2 pivoted at 2a to selectively open the inlet openings 1a and 1b in response to a manual action. When the damper 2 is in a downward position outside air is introduced into the duct and when in an upward position the vehicle inside air is recirculated through the duct 1. The air blower 3 provides a stream of forced intake air to the evaporator 4 to cool it down to a low temperature. An air mixing damper 7 is provided on the upstream side of the heater 6 which is pivoted at 7a. The angular position of the air mixing damper 7 with respect to a reference 7b, which is parallel with the front face of the heater 6, is controlled by a connecting rod 7c connected to an actuator 17.

An air compressor 5, selectively coupled to the engine output shaft by an electromagnetic coupling 5c, compresses refrigerant supplied from the evaporator 4, the compressed refrigerant being supplied to a condenser 5a to liquefy the pressurized refrigerant and thence to an expansion valve 5b from which a liquid of low pressure and temperature is supplied to the evaporator 4. The refrigerant supplied to the evaporator 4 absorbs the heat of the air supplied thereto from the blower 3 and recirculates through the compressor 5 to repeat the process just mentioned.

The electromagnetic coupling or clutch 5c is controlled by a signal supplied from a drive circuit 18 which in turn takes its input signals from a microcomputer 14 in a manner as will be described later. The microcomputer 14 also controls the actuator 17 by way of a valve control circuit 16. More specifically, the actuator 17 includes valves 17b and 17c which are provided in a passage 17e one end of which is connected to an appropriate source of vacuum 17d and the other end of which is open to the atmosphere. The passage 17e, which runs between the valves 17b and 17c, is connected to the vacuum chamber of a vacuum operated device 17a having its diaphragm connected to the connecting rod 7c. The valves 17b and 17c are individually controlled by signals supplied from the valve control circuit 16 which translates digtal signals from the microcomputer 14 into the respective valve control signals. The opening of the valves 17b and 17c are proportioned to regulate the pressure in the vacuum chamber of the device 17a to adjust the angle $\theta_a$ of the air mixing damper 7 to regulate the amount of cool air presented to the heater 6. When the angle $\theta_a$ is minimum the air cooled by the evaporator 4 is all directed to the vehicle interior 8 and when $\theta_a$ is maximum a maximum amount of cooled air is directed to the heater 6. The temperature of air directed into the vehicle interior is thus regulated by the mixture ratio of cool and warm air controlled by the damper 7.

An analog-digital converter 13 takes it analog signals from various sensing elements including a temperature sensor 9 located in the vehicle interior 8, an opening angle sensor 10 which is connected to the connecting rod 7c, and a temperature sensor 10 located outside of the vehicle body to sense the ambient temperature. A temperature setting circuit 12 is also connected to the converter 13 to establish a reference temperature to which the temperature of the air-conditioned vehicle interior is controlled. The microcomputer 14 receives the digitally converted signals from the converter 13 to control the drive circuit 18 and the valve control circuit 16 in a manner as will be described.

The microcomputer 14, which is programmed according to the control algorithm of the present invention, is supplied with a stabilized D.C. voltage from a power supply (not shown) including a vehicle battery. The microcomputer 14 is any one of conventional designs fabricated on an LSI chip which includes a read only memory in which the various steps of temperature control algorithm are stored.

The operation of the microcomputer 14 will now be explained with reference to the flowcharts shown in FIGS. 2 to 5. The microcomputer 14 is ready to start executing the programmed control steps at 1-millisecond intervals as soon as it is energized by the operating voltage. The first step executed by the microcomputer involves an initializing routine in which timer data T is set to "1". This initializing routine is followed by a step 100 in which "1" is subtracted from the timer data T so that T becomes equal to 0. The T=0 condition is detected in a decision step 200 so that it is followed by a routine 300 in which the angle $\theta_M$ of the air mixing damper 7 is calculated on the basis of digital data supplied from the A/D converter 13 representing the sensed temperature signals from the sensors 9 and 11, angular position signal from the sensor 10 indicating the actual position of the damper 7 and temperature setting signal from the circuit 12. This calculation is executed by using a predetermined formula into which the digital outputs of the converter 13 are substituted. The angle calculation routine 300 is followed subsequently by an economy control routine 400 in which, as will be described in greater detail with reference to FIG. 3, the microcomputer detects whether there is a surplus in cooling capacity of the air conditioner using the damper opening angle data A (which corresponds to $\theta_a$) and the variation rate of interior temperature Tr with respect to the temperature setting Ts and proceeds to generate an ON-OFF control signal to the compressor drive circuit 18.

The economy control routine 400 is followed by a calculation routine 500 in which, as will be described in greater detail with reference to FIG. 4, a correction angle $\theta_C$ is calculated from a time data representing the amount of time elapsed from the deactivation of the compressor 5. Subsequently, the timer data T is set to "100" in a step 600.

When the program control subsequently reaches the step 100, the timer data T is decreased to T=99, so that in the following step 200, a "no" decision route is taken to a damper opening adjustment routine 700. Therefore, during a subsequent 100 millisecond interval, the damper adjustment routine 700 is recyclically executed at 1-millisecond intervals to make adjustment of the angle $\theta$ of the damper 7 based on the angle data $\theta_M$, $\theta_C$ and A, as will be described in detail with reference to FIG. 5.

At the termination of the 100-millisecond interval, the timer data T becomes zero, which is detected in the step 200. Thus, the routines 300, 400, 500 and 600 are subsequently executed in succession to update their damper angle data. The above described process will be repeated to efffect on-off control for the compressor 5 and angle adjustment of the air mixing damper 7 so that the interior temperature Tr reaches the setting value Ts.

The detail of the economy control routine 400 will now be described with reference to FIG. 3. In a step 401 the amount of deviation $\Delta T$ of the interior temperature Tr from the setting value Ts is detected. The microcomputer then proceeds to detect whether the angular position of the damper 7, as represented by data A, is such that the cooling power of the air conditioner is at a maximum. This condition corresponds to the angle data A being equal to zero and is detected in a step 402. If A=0 is detected, the compressor 5 is activated in a step 403 by applying a turn-on control signal to the compressor drive circuit 18. In a step 404, transient timer data N is set to a maximum value $N_{max}$ and in a step 405 the previous temperature deviation $\Delta T_0$ is replaced with the most recent deviation $\Delta T$ which was detected in the step 401.

If the damper opening is other than zero degrees, a step 406 is executed to detect whether the temperature deviation $\Delta T$ is positive. The step 406 is followed by a step 407 in which the temperature deviation $\Delta T$ is compared with a predetermined value "a" representing a deviation limit in order to detect whether the temperature variation falls within a preselected range set by the limit data "a". If the temperature deviation is detected as falling within that range, program control goes to a step 408 to detect whether the most recent temperature deviation $\Delta T$ is smaller than the previous deviation $\Delta T_0$, and if so, a step 409 is executed whereby the compressor 5 is deactivated. Following the step 409, the previous deviation data $\Delta T_0$ is replaced at step 405 with the most recent deviation data $\Delta T$ which was used in the steps 406 to 408.

If the temperature deviation is negative, a "no" decision route is taken from the step 406 to the step 409 to turn off the compressor 409. When the temperature deviation T is greater than the preset limit "a", a "no" decision route is taken from the step 407 to the step 403 to activate the compressor 5. If the temperature deviation T is greater than the previous deviation $T_0$, a "no" decision route is taken from the step 408 to the step 405 whereby the operating condition of the compressor 5 remains unchanged.

Figure 4:
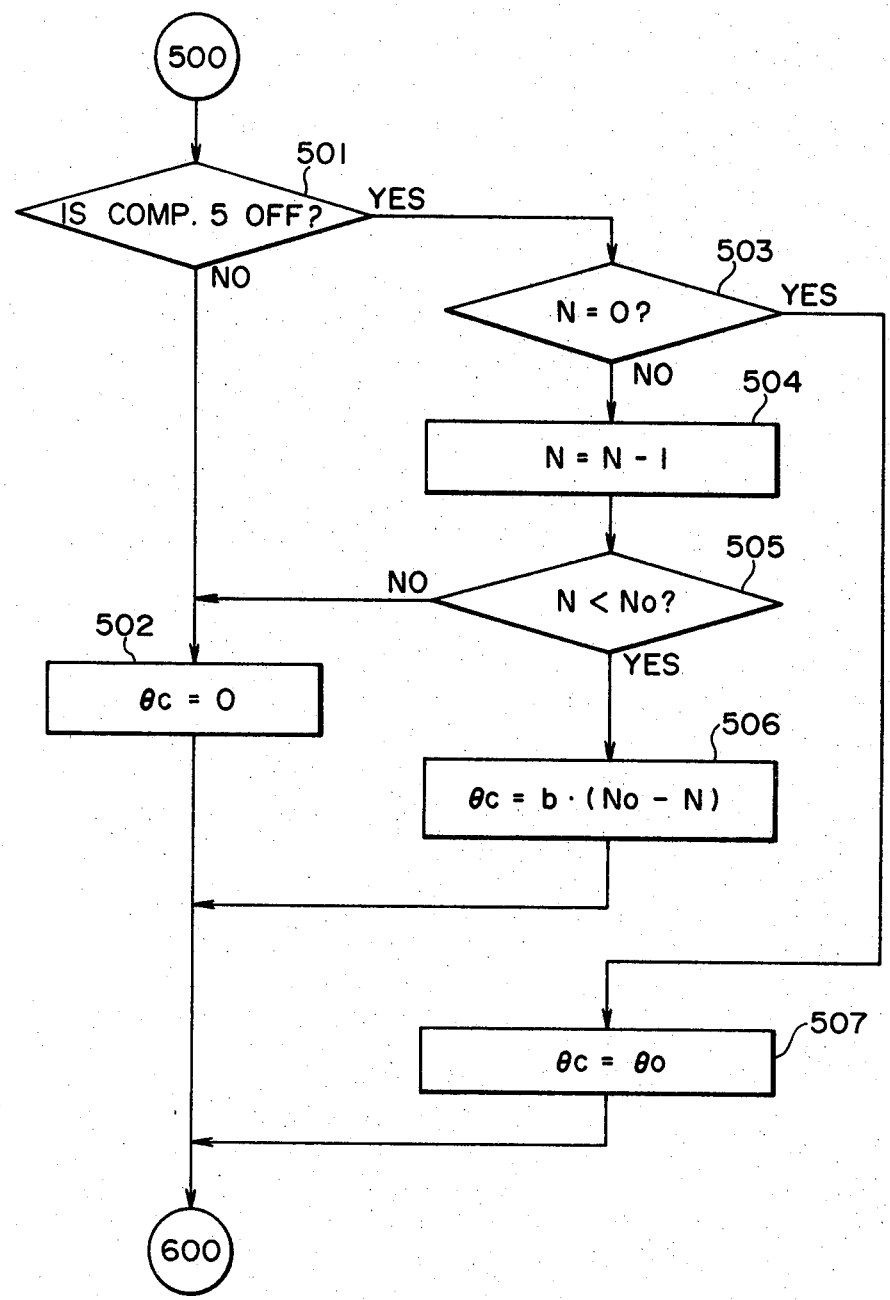
FIG. 4 is an illustration of a flowchart describing the steps of the angle correction derivation routine of FIG. 2.

Referring to FIG. 4, program control proceeds with a step 501 in which the operating condition of the compressor 5 is checked. If the compressor 5 is operating, the damper angle correction data $\theta_C$ is set to zero in a step 502 and if the compressor 5 is detected as "not operating" in the step 501, the program control proceeds to a step 503 to check to see if the transient timer data N is equal to zero. If N=0 is not detected, the timer data N is decreased by "1" in a step 504 which is followed by a step 505 to check to see if N is smaller than $N_0$ which represents a point in time for starting a transient correction for the damper 7. If this starting point is still not reached, the correction clear step 502 is executed. When the correction starting point is reached, the angle correction data $\theta_C$ is calculated in a step 506 using a formula $\theta_C = b(N_0 - N)$, where b is a constant. If N=0 is detected in the step 503, an "yes" decision route is taken to a step 507 the angle correction data $\theta_C$ is set to $\theta_0$ which equals $bN_0$.

Figure 6:
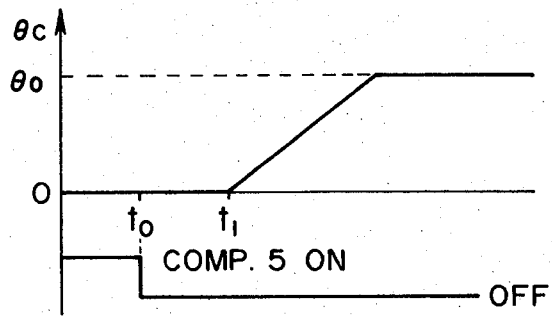
FIG. 6 is an illustration of the reference signal which is used to control the mixing damper of FIG. 1.

It will be appreciated from the foregoing that as the steps of FIG. 4 are recyclically executed, the angle correction value $\theta_C$ is held at zero from time $t_0$ at which the compressor 5 is turned off to time $t_1$ which corresponds to the timer data N and the correction is started at time $t_1$ by gradually increasing $\theta_C$ as a function of time until it reaches $\theta_0$ as seen in FIG. 6. The correction value $\theta_C$ is held at $\theta_0$ until the compressor 5 is turned on. The interval between times $t_0$ and $t_1$ is selected to correspond to the time during which the compressor 5 is still operating under its own rotary inertia so that the angle correction may start at appropriate timing.

Figure 5:
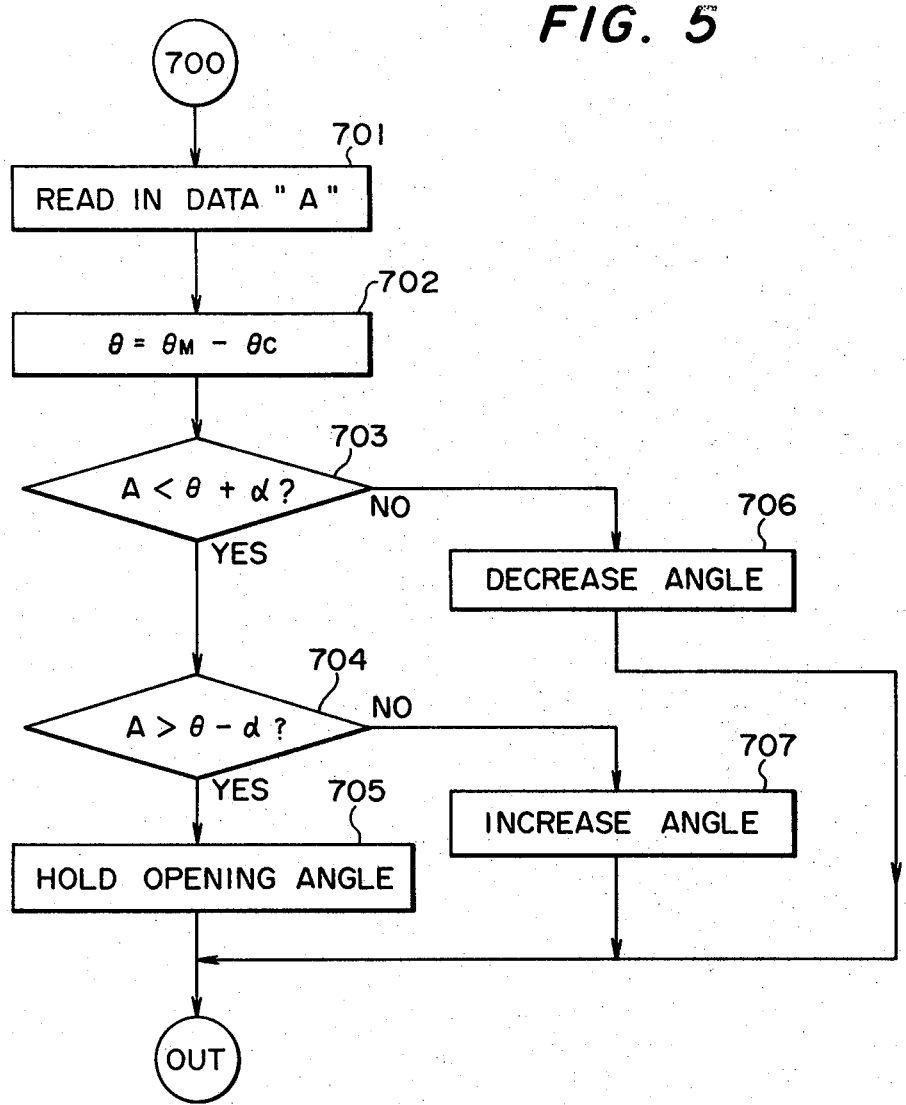
FIG. 5 is an illustration of a flowchart which describes the steps of the angle adjustment routine of FIG. 2.

Referring to FIG. 5, the damper adjustment routine 700 comprises steps 701 to 707. Starting with the step 701, the microcomputer 14 reads in the damper angle data A detected by the sensor 10 and proceeds to the step 702 to derive a reference angle value $\theta$ by subtracting the correction value $\theta_C$ from the value $\theta_M$ which was derived in the calculation routine 300, FIG. 2. In subsequent steps 703 and 704, the angle value A is compared with an upper limit $\theta + \alpha$ and a lower limit $\theta - \alpha$ to detect whether the damper angular position falls within a hysteresis range set by $\alpha$ above and below the reference $\theta$. If the angle value A is detected as falling within the hysteresis range, a delay interval is introduced by holding the angular position to prevent the damper 7 from swinging on both sides of the reference value $\theta$, a phenomenon known as "hunting". This holding operation is effected in the step 705. If the angle value A is detected as being greater than the upper limit $\theta + \alpha$ in the step 703, a "no" decision route is taken to the step 706 to decrease the opening of damper 7, and if it is detected as being smaller than the lower limit $\theta - \alpha$ the step 707 is executed to increase the damper opening. The damper control signals are therefore generated in the steps 705, 706 and 707 and supplied on separate conductors from the microcomputer 14 to the valve control circuit 16 which in turn controls the damper actuator 17 in accordance with the instructions given by the steps 705, 706 and 707.

Figure 3:
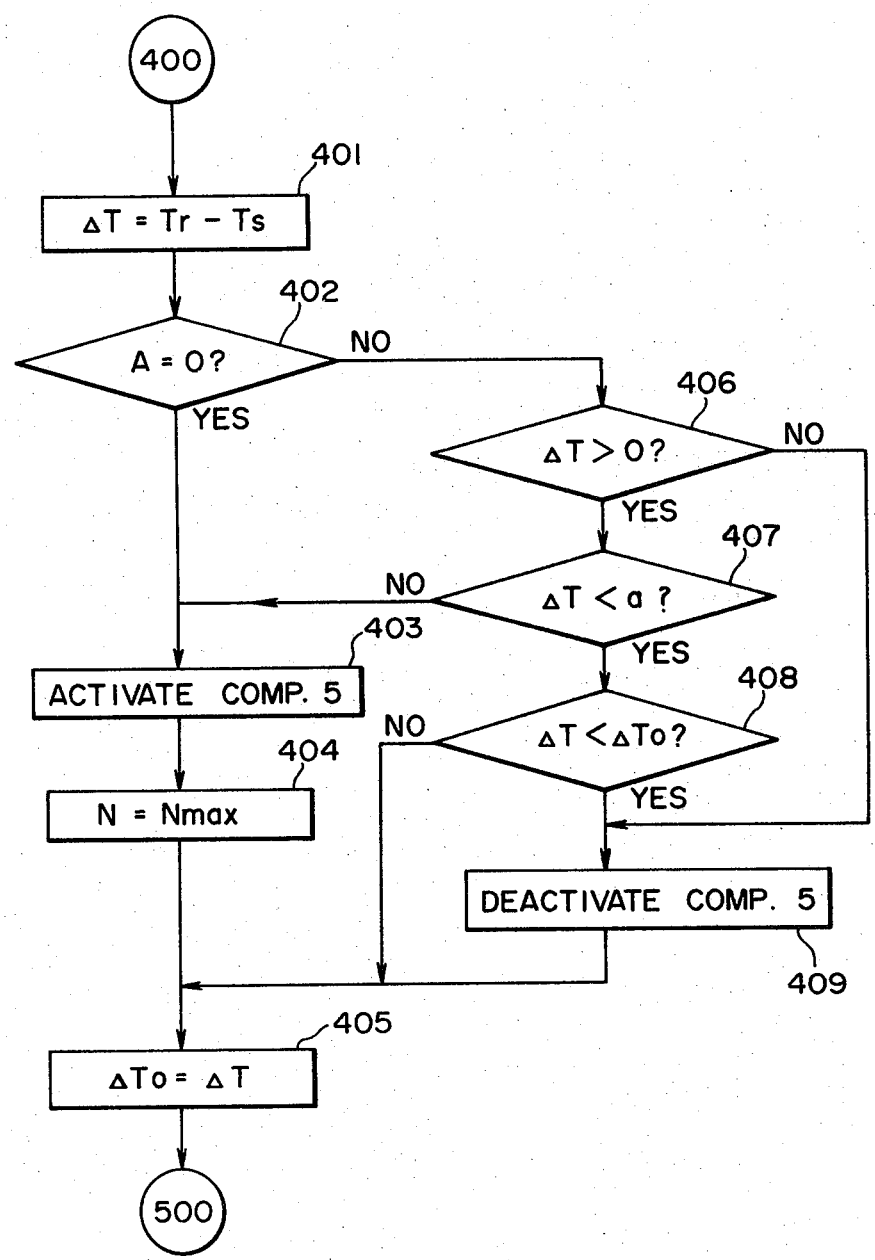
FIG. 3 is an illustration of a flowchart which describes in detail the steps of the economy control routine of FIG. 2.

It is noted therefore that when the air conditioning operation is initiated during the summer season, the steps 401, 402, 406, 407 and 403 are followed in the economy control routine 400, FIG. 3, to activate the compressor 5, and in the correction angle calculation routine 500, the step 502 is executed to set the angle correction data $\theta_C$ to zero before the step 600 is executed. Subsequently, in the damper adjustment routine 700, the damper 7 is adjusted in accordance with the calculated angle data $\theta_M$ derived in the routine 300 to decrease the vehicle interior temperature Tr toward the reference setting Ts. As previously described, the damper adjustment routine 700 is recyclically executed at 1-millisecond intervals during the interval of 100 milliseconds and subsequently the routines 300 to 600 are executed to update the angle data $\theta_M$ and $\theta_C$ for subsequent angle adjustment routine 700.

In this way, the interior temperature Tr approaches the setting value Ts and therefore the temperature deviation T falls within the tolerance $\pm a$ and, if $\Delta T$ is smaller than $\Delta T_0$, the steps 402, 406 to 409 are followed to turn off the compressor 5. The decision made at step 501 is thus switched to "yes" and the steps 503, 504 and 502 are successively executed to clear the correction data $\theta_C$. Upon the turn-off of compressor 5, a delay interval of a few seconds is introduced before transient temperature corrective action is taken. During this delay interval the steps 503, 504, 505 and 502 are recyclically executed to decrease N from $N_{max}$ to $N_0$, whereby the decision made at step 505 is switched to "yes" to execute the step 506 to initiate the transient temperature correction by recyclically executing the steps 503, 504, 505 and 506 to generate angle correction data $\theta_C$. The amount of correction increases as a function of time so that the damper 7 is swung toward the maximum cooling side, or reference angular position 7b.

When N=0 is detected at subsequent step 503, the correction data $\theta_C$ is set to $\theta_0$ at step 507 before the routine 600 is executed.

As a result, the interior temperature Tr increases with a resultant increase in the deviation value $\Delta T$. When this deviation value $\Delta T$ exceeds the tolerance "a", "no" decision is made at step 407 to activate the compressor 5 at step 403. After setting the correction timer data N to $N_{max}$ at step 404 and replacing the previous deviation data $\Delta T_0$ with the most recent deviation data $\Delta T$, the microcomputer then proceeds to the step 501 and thence to the step 502 to clear the correction data $\theta_C$.

During the above-described sequence of steps, compressor operation is shut off for as long a period as possible in the economy control routine 500 to reduce the amount of energy consumed by the compressor 5. In response to the compressor 5 being shut off, a temperature transient corrective action is initiated to gradually increase the amount of the air cooled by the evaporator 4 which is directed toward the vehicle interior 8. Thus, a rapid variation of interior temperature is prevented.

The above described embodiment shows only one example of this invention. Other forms of the invention are apparent to those skilled in the art. For example, analog electronic circuits or wired logic circuits could equally be as well employed to accomplish the essence of the present invention.

What is claimed is:

1. A method for controlling a vehicle-mounted air conditioner having an evaporator for cooling air directed toward the interior of the vehicle, a compressor controllably coupled in the presence of a control signal to a prime mover of the vehicle for supplying pressurized refrigerant to said evaporator to increase its cooling capacity or decoupled in the absence of said control signal from said prime mover to decrease the cooling capacity of said evaporator, a heating unit located downstream of said evaporator and partially occupying the passage of said cooled air for directing warm air toward said vehicle interior, and means for adjusting the amount of said cooled air presented to said heating unit relative to the amount of said cooled air directed to said vehicle interior, comprising the steps of:

(a) measuring the amount of time elapsed from the instant when said compressor is changed from a first condition in which the compressor is coupled to said prime mover to a second condition in which the compressor is decoupled from said prime mover, or when said compressor is changed from said second condition to said first condition; and (b) controlling said adjusting means to gradually vary the amount of said cooled air presented to said heating unit as a function of time when said measured amount of time reaches a predetermined value.

2. A method as claimed in claim 1, wherein said adjusting means is a damper pivotally movable between a first position in which the amount of said cooled air presented to said heating unit is at a minimum and a second position in which said presented air is at a maximum, and wherein the step (b) comprises:

generating a reference signal of which the magnitude varies gradually as a function of time from a first level to a second level when said measured amount of time reaches said predetermined value;

converting the angular position of said adjusting means relative to said first position into a corresponding angular position signal;

detecting whether said angular position signal is greater or smaller than the instantaneous value of said reference signal; and causing said adjusting means to move its angular position toward said first or second position respectively when said angular position signal is detected as being greater or smaller than said instantaneous value, or holding the angular position of said adjusting means when said angular position signal approximately corresponds to said instantaneous value.

3. A method as claimed in claim 1 or 2, further comprising the steps of:

(c) detecting when the temperature of said vehicle interior is lower or higher than a preselected value; and (d) coupling said compressor to said prime mover when said vehicle interior temperature is detected as being higher than said preselected value, or decoupling said compressor from said prime mover when said vehicle interior temperature is detected as being lower than said preselected value.

4. A control system for an air conditioner mounted in a motor vehicle having an evaporator for cooling air directed toward the interior of said vehicle, a compressor operable to supply pressurized refrigerant to said evaporator, means for controllably coupling said compressor to a prime mover of said vehicle to increase the cooling capacity of the evaporator or decoupling said compressor from said prime mover to decrease the cooling capacity of the evaporator, a heating unit located downstream of said evaporator and partially occupying the passage of said cooled air directed toward said vehicle interior for directing warm air toward said vehicle interior, and a damper pivotally movable between a first position in which said coolied air presented to said heating unit is at a minimum and a second position in which said presented air is at a maximum, comprising:

first means for measuring the amount of time elapsed from the time when said compressor is changed from a first condition in which the compressor is coupled to said prime mover to a second condition in which the compressor is decoupled from said prime mover or when said compressor is changed from said second condition to said first condition; and second means responsive to said measured amount of time reaching a predetermined value for gradually varying the angular position of said damper to compensate for a rapid variation of said vehicle interior temperature.

5. A control system as claimed in claim 4, wherein said second means comprises:

means for generating a reference signal of which the magnitude varies gradually as a function of time from a first level to a second level when said measured amount of time reaches said predetermined value;

means for converting the angular position of said damper relative to said first position into a corresponding angular position signal;

means for detecting whether said angular position signal is greater or smaller than the instantaneous value of said reference signal by a predetermined amount to generate a first or a second control signal, respectively; and means for moving the angular position of said damper toward said first position in response to said first control signal and moving said damper toward said second position in response to said second control signal.

6. A control system as claimed in claim 4 or 5, further comprising:

means including a temperature sensor located in said vehicle interior for detecting when the temperature of said vehicle interior is lower or higher than a preselected value; and means for causing said coupling means to decouple said compressor from said prime mover when said vehicle interior temperature is detected as being lower than said preselected value or causing said coupling means to couple said compressor to said prime mover when said vehicle interior temperature is detected as being higher than said preselected value.

* * * * *